Sept. 22, 1931.    I. F. WEBB    1,823,963
POWER TRANSMITTING DEVICE
Filed July 17, 1930    3 Sheets-Sheet 3

Inventor
Irving F. Webb

Witness:

Patented Sept. 22, 1931

1,823,963

UNITED STATES PATENT OFFICE

IRVING F. WEBB, OF ELIZABETH, NEW JERSEY, ASSIGNOR TO THE SINGER MANUFACTURING COMPANY, OF ELIZABETH, NEW JERSEY, A CORPORATION OF NEW JERSEY

POWER-TRANSMITTING DEVICE

Application filed July 17, 1930. Serial No. 468,543.

This invention relates to improvements in power-transmitting devices and has for its primary object to provide a combined electric-motor and power-transmitting unit adaptable for use in relatively different positions of the motor and the machine or device to be driven from said motor.

Another object of the invention is to provide convenient means for changing the rotation speed derived from an electric motor rotating at a substantially constant speed. A further object is to provide the power-transmitting unit with convenient means for maintaining efficient driving connections between a pulley carried by the motor rotor and a counter or speed-changing pulley. A still further object of the invention is to provide for efficient lubrication of the counter-pulley bearing in different angular positions into which said counter-pulley may be adjusted with respect to the motor-pulley axis.

The foregoing and other objects and advantages in view, together with means whereby the same may be carried into effect, will best be understood from the following description of a preferred embodiment thereof illustrated in the accompanying drawings, in which:—

Figure 1:
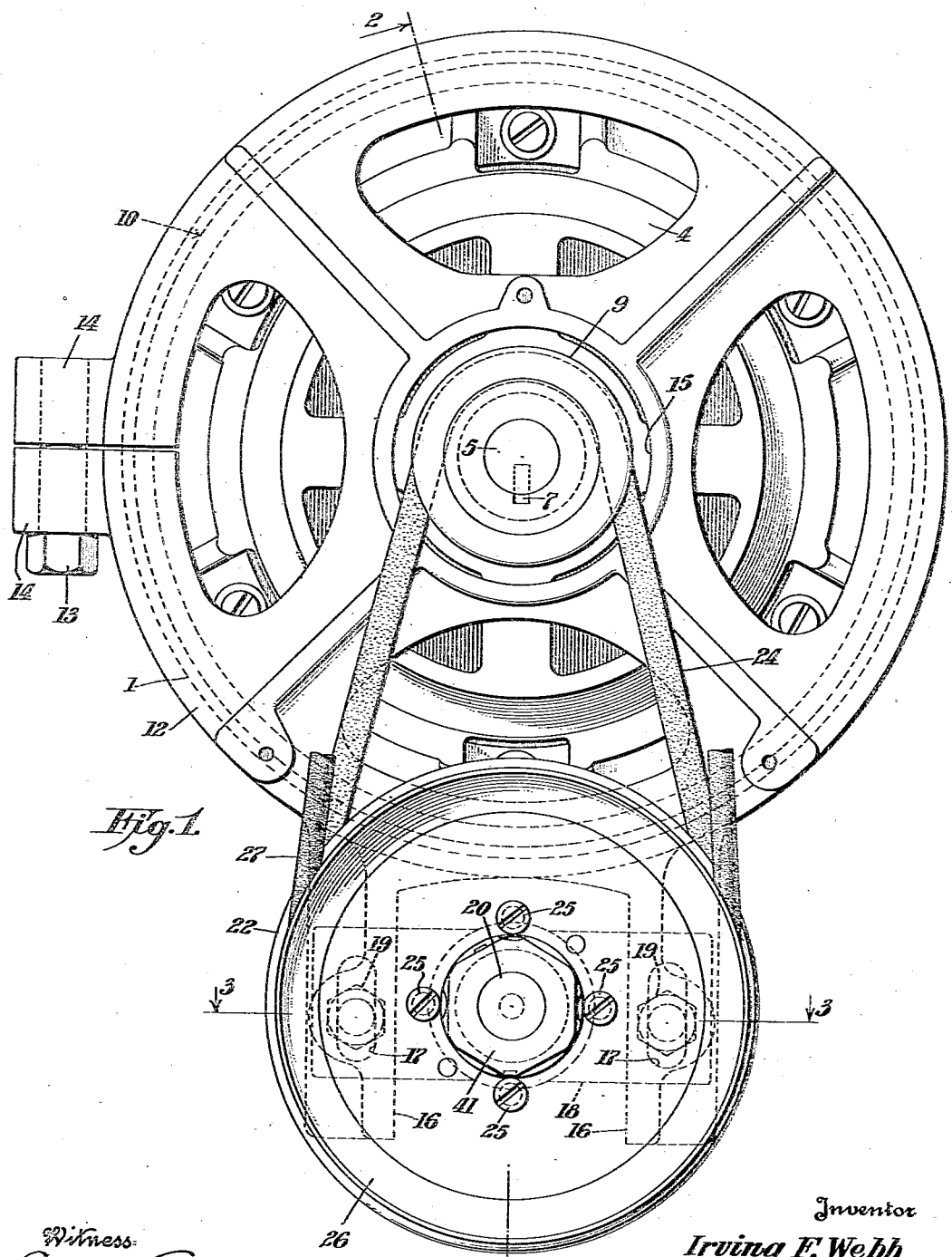
Figure 2:
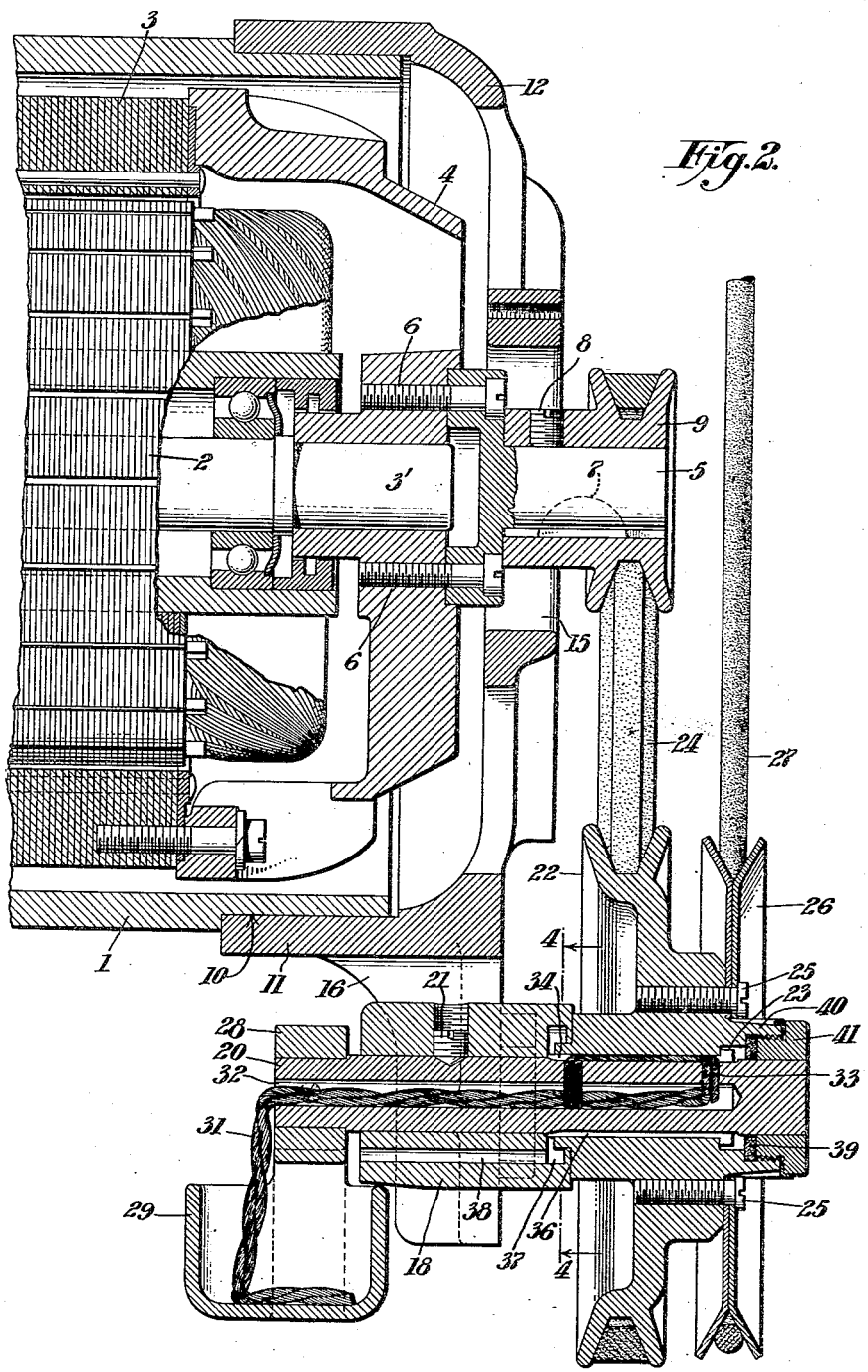
Figure 3:
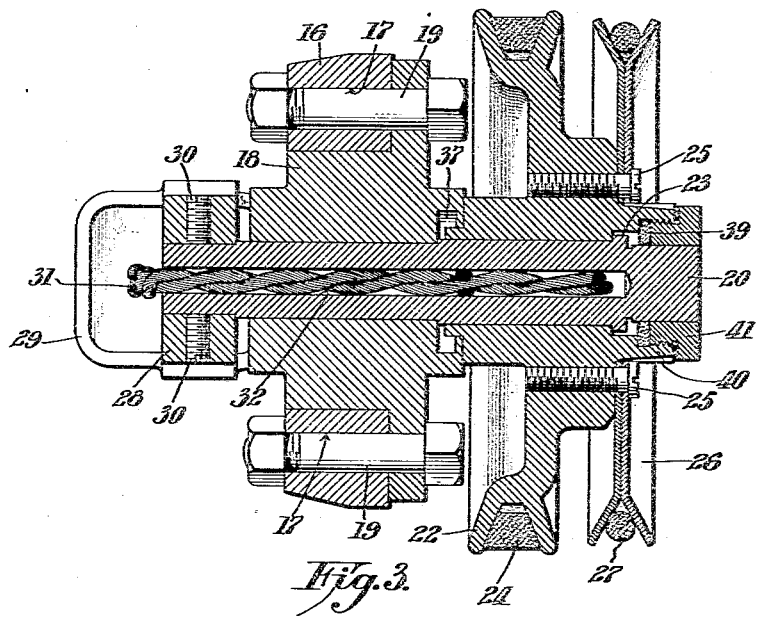
Figure 4:
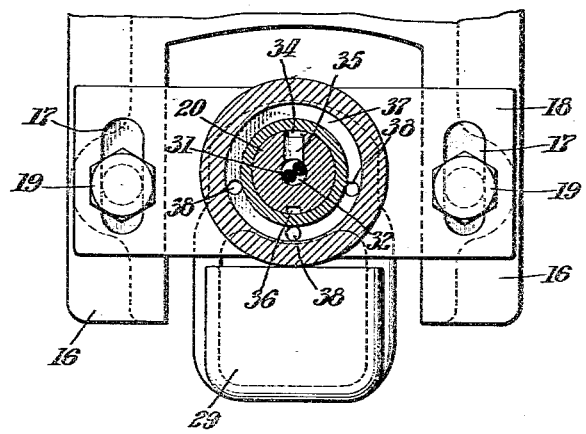

Fig. 1 is an end elevation of the improved electric-motor unit, viewed from the belt-pulley side thereof. Fig. 2 is a sectional view substantially on the line 2—2 of Fig. 1. Fig. 3 is a sectional view substantially on the line 3—3 of Fig. 1. Fig. 4 is a sectional view substantially on the line 4—4 of Fig. 2.

The electric motor illustrated in the drawings has a frame or casing 1, housing a stator 2 and a rotor 3 of the type in which the rotor is disposed externally of the stator, although it will be obvious that the present invention is not confined to a motor having this type of stator and rotor arrangement. The rotor 3 is carried by a rotary shaft 3' journaled in suitable bearings provided within the stator 2.

At one end thereof, the rotor carries a spider 4 to which the flanged end of a supporting-stud 5 is secured by screws 6. Fixed upon the supporting-stud 5, by means of a key 7 and a set-screw 8, is the hub of a belt-pulley 9 which by the described connection with the rotor constitutes the motor pulley from which power may be transmitted to other machines or devices.

At one end, the motor-frame 1 is provided with an annular seat 10 which is concentric with the axis of rotation of the motor-pulley 9. Embracing and frictionally clamped upon said annular frame-seat 10 is a cylindrical ring 11 constituting a split flange of a motor end-cap 12, the securing means for said end-cap comprising a screw-bolt 13 engaging the ears 14 projecting from the adjacent ends of the split end-cap flange. The end-cap 12 has an opening 15 substantially centrally thereof, affording clearance for the motor-pulley hub, it being understood that the described supporting means for the end-cap provides for adjustment of said end-cap into any position circularly about the axis of the belt-pulley 9.

Projecting from the peripheral flange 11 of the frame end-cap is a yoke constituted by spaced arms 16 provided with parallel slots 17 elongated lengthwise of said arms. Adjustably mounted upon said yoke is a supporting-block 18 secured by bolts 19 passing through the arm-slots 17, whereby the supporting-block 18 may be adjusted toward and from the axis of the motor-pulley. The supporting-block 18 is apertured to receive a chambered bearing-stud 20 projecting from opposite sides of said supporting-block, the bearing stud being disposed substantially parallel with the axis of the motor-pulley 9 and secured in fixed position upon the supporting-block 18 by means of a set-screw 21.

Journaled for rotation upon the bearing-stud 20 is a counter-pulley 22 held against movement endwise upon the bearing-stud between a rib 23 upon the latter and the supporting-block 18, said counter-pulley being connected with the motor-pulley 9 by means of a belt 24. Detachably secured by screws 25 upon the counter-pulley 22 for rotation therewith is a power-transmitting pulley 26 which may be connected by a belt 27 with the machine to be driven. As the transmission pulley 26 is readily detachable from the counter-pulley, it is apparent that it may be interchanged with transmission pulleys of different sizes to meet the speed requirements of the machine to be driven.

Upon the projecting end of the bearing-stud, opposite to that upon which the counter-pulley 22 is journaled, is mounted an apertured boss 28 of a dished bracket 29 constituting a lubricant reservoir, said bracket being secured upon the bearing-stud by set screws 30 for adjustment circularly about the axis of the counter-pulley 22.

Leading from the reservoir is a lubricant-conducting wick 31 which enters a chamber 32, extending longitudinally of the bearing-stud 20, and passes from said chamber through a radial aperture 33 into a groove 34 disposed lengthwise of the pulley-bearing surface of said bearing-stud. The wick-groove 34 is intersected by another bearing stud aperture 35 through which the end of the wick is again passed into the chamber.

Any excess lubricant supplied to the counter-pulley bearing surface is conducted back into the reservoir and to this end the bearing-stud 20 has an additional peripheral groove 36 substantially parallel with and preferably diametrically opposite to the wick-groove 34. Both grooves 34 and 36 terminate at their inner ends in a lubricant-collecting annular recess 37 provided in the side of the supporting-block 18 adjacent to the counter-pulley 22. Communicating with said recess 37 are several lubricant-conducting apertures 38 extending through the supporting-block 18 to terminate in the opposite side thereof at a point above the reservoir 29.

Leakage of lubricant at the end of the bearing-stud 20 opposite to the reservoir is prevented by a washer 39 of felt or other suitable material, snugly surrounding said bearing-stud and secured to the counter-pulley within a shouldered flange 40 thereof by a nut 41 threaded into said flange.

From the foregoing description, it will be understood that to accommodate the relative position of the motor and the driven machine without altering the tension of the belt 24, the counter- and transmission-pulleys may be together adjusted accurately into the desired position about the axis of the motor pulley by simply loosening the motor end-cap securing screw-bolt 13. The belt 24 may, however, be maintained properly tightened by adjustment of the supporting-block 18 upon the end-cap yoke. When the counter-pulley is adjusted about the motor-pulley axis, the lubricant-reservoir may be correspondingly adjusted to prevent spilling the lubricant therefrom and also to serve as a basin for the returned excess lubricant by loosening the set-screws 30 and swinging the reservoir bracket 29 circularly about the bearing-stud 20.

Having thus set forth the nature of the invention, what I claim herein is:—

1. An electric motor having a frame housing a rotor and a stator, said frame being provided with an annular seat concentric with the axis of rotation of the rotor, a member having a split cylindrical ring embracing said frame seat, means frictionally clamping said cylindrical ring upon the frame seat, a driving element carried by said rotor, a driven element operatively connected with said driving element and journaled upon said member for rotation upon an axis substantially parallel with the rotor axis, and a power-transmitting member rotatable with the driven element.

2. An electric motor having a frame housing a rotor and a stator, said frame including an end-cap circularly adjustable about the axis of rotation of the rotor, a driving element carried by said rotor, a driven element operatively connected with said driving element rotatable about an axis substantially parallel with the rotor-axis, a journal-bearing for said driven element upon the motor end-cap including means for relatively adjusting the axes of rotation of said driving and driven elements toward and from each other, and a power-transmitting member rotatable with the driven element.

3. An electric motor having a frame housing a rotor and a stator, said frame being provided with an annular end-cap seat concentric with the axis of rotation of the rotor, a motor-frame end-cap having a split flange embracing said frame-seat, means frictionally clamping said end-cap upon the motor-frame seat, a driving element carried by said rotor, a driven element operatively connected with said driving element journaled upon said end-cap for rotation upon an axis substantially parallel with the rotor-axis, and a power-transmitting member rotatable with said driven element.

4. An electric motor having a frame housing a rotor and a stator, said frame including an end-cap circularly adjustable about the axis of rotation of the rotor, a driving pulley carried by the rotor, a counter-pulley rotatable about an axis substantially parallel with the rotor-pulley axis, a journal-bearing for the counter-pulley upon the motor-frame end-cap including means for relatively adjusting the driving and counter-pulley axes toward and from each other, a belt connecting said pulleys, and a power-transmitting pulley detachably secured upon the counter-pulley for rotation therewith.

5. An electric motor having a frame housing a rotor and a stator, said frame including an end-cap circularly adjustable about the axis of rotation of the rotor, an arm projecting from said end-cap, a supporting block secured upon said arm for adjustment toward and from the rotor-axis, a driving pulley carried by said rotor, a counter-pulley rotatable about an axis substantially parallel with the rotor-axis, a journal-bearing for said counter-pulley upon the supporting-block, a belt connecting said driving and driven pulleys, and a power-transmitting member rotatable with said counter-pulley.

6. An electric motor having a frame housing a rotor and a stator, said frame including an end-cap circularly adjustable about the rotor axis, a yoke integral with and projecting from said end-cap, a supporting block secured upon said yoke for adjustment toward and from the rotor-axis, a bearing-stud carried by said supporting block, a driving pulley carried by said rotor, a counter-pulley rotatively journaled upon said bearing-stud, a belt connecting said pulleys, and a power-transmitting member rotatable with said counter-pulley.

In testimony whereof I have signed my name to this specification.

IRVING F. WEBB.